(12) United States Patent
Wu

(10) Patent No.: US 12,117,269 B1
(45) Date of Patent: Oct. 15, 2024

(54) DROP-RESISTANT RED DOT SCOPE BASE AND RED DOT SCOPE

(71) Applicant: Xiaozhong Wu, Guangzhou (CN)

(72) Inventor: Xiaozhong Wu, Guangzhou (CN)

( * ) Notice: Subject to any disclaimer, the term of this patent is extended or adjusted under 35 U.S.C. 154(b) by 0 days.

(21) Appl. No.: 18/418,297

(22) Filed: Jan. 21, 2024

(30) Foreign Application Priority Data

Dec. 21, 2023 (CN) .......................... 202323515858.5

(51) Int. Cl.
| | |
|---|---|
| *F41G 1/30* | (2006.01) |
| *F41G 11/00* | (2006.01) |
| *G02B 7/02* | (2021.01) |
| *G02B 27/20* | (2006.01) |

(52) U.S. Cl.
CPC .............. *F41G 11/003* (2013.01); *G02B 7/02* (2013.01); *G02B 27/20* (2013.01)

(58) Field of Classification Search
CPC ........ F41G 11/003; F41G 11/001; F41G 1/30; G02B 7/02
See application file for complete search history.

(56) References Cited

U.S. PATENT DOCUMENTS

| 11,747,112 B2 * | 9/2023 | Reese ...................... F41G 1/30 |
| | | 42/113 |
| 2020/0200507 A1 * | 6/2020 | Curry ...................... F41G 1/30 |
| 2022/0390207 A1 * | 12/2022 | Chavez .................... F41G 1/01 |
| 2023/0176388 A1 * | 6/2023 | Parker ................. G02B 27/0189 |
| | | 359/13 |

* cited by examiner

Primary Examiner — J. Woodrow Eldred

(57) ABSTRACT

The present disclosure provides a drop-resistant red dot scope base and a red dot scope. The drop-resistant red dot scope base includes: a mounting base body having a mounting portion, wherein the mounting portion is provided with a mounting hole, and the mounting hole is used for accommodating a lens; a first protective base body disposed on a front end of the mounting base body and connected to the mounting base body, and provided with a first avoidance hole, wherein the first avoidance hole is connected to a front end of the mounting hole, wherein a projection in a forward and rearward direction of the first protective base body protrudes out of a projection in a forward and rearward direction of the mounting base body; a second protective base body disposed on a rear end of the mounting base body and connected to the mounting base body, and provided with a second avoidance hole, wherein the second avoidance hole is connected to a rear end of the mounting hole, wherein a projection in a forward and rearward direction of the second protective base body protrudes out of a projection in a forward and rearward direction of the mounting base body. It can effectively prevent the lens from falling and cracking, and can realize all-round protection for the lens, with good drop-resistant performance and better durability, which can reduce the maintenance cost and help to promote the popularization and application.

10 Claims, 5 Drawing Sheets

DROP-RESISTANT RED DOT SCOPE BASE AND RED DOT SCOPE

TECHNICAL FIELD OF THE INVENTION

The present disclosure relates to the technical field of scope, in particular a drop-resistant red dot scope base and a red dot scope.

BACKGROUND OF THE INVENTION

A red dot scope is one of current hot-selling scopes, which can be used on different types of guns, such as a pistol, a submachine gun, and a rifle etc., and can withstand the impacts of violent motion or vibration generated during the use of the gun and maintain stable performance. However, due to the defect design of the scope base structure of today's red dot scopes, the lens of the red dot scope is easily cracked when the red dot scope falls to the ground, and has poor drop-resistant performance.

SUMMARY OF THE INVENTION

The embodiment of the present disclosure provides a drop-resistant red dot scope base and a red dot scope (i.e. red dot sight) for solving the problems of the related technology, and the technical solutions are as follows:

In the first aspect, the embodiment of the present disclosure provides a drop-resistant red dot scope base, comprising:

a mounting base body having a mounting portion, wherein the mounting portion is provided with a mounting hole, wherein the mounting hole penetrates through the mounting portion from front to back and the mounting hole is used for accommodating a lens;

a first protective base body, wherein the first protective base body is disposed on a front end of the mounting base body and is connected to the mounting base body, wherein the first protective base body is provided with a first avoidance hole, wherein the first avoidance hole penetrates through the first protective base body from front to back (i.e. fore and aft or in the front and back), wherein the first avoidance hole is connected to the front end of the mounting hole so as to expose the front end of the mounting hole, and wherein a projection of the first protective base body in a forward and rearward direction protrudes out of a projection of the mounting base body in a forward and rearward direction; a second protective base body, wherein the second protective base body is disposed on a rear end of the mounting base body and is connected to the mounting base body, wherein the second protective base body is provided with a second avoidance hole, wherein the second avoidance hole penetrates through the second protective base body from front to back (i.e. fore and aft or in the front and back), wherein the second avoidance hole is connected to a rear end of the mounting hole so as to expose the rear end of the mounting hole, and wherein a projection of the second protective base body in a forward and rearward direction protrudes out of a projection of the mounting base body in a forward and rearward direction.

In one embodiment, at least a part of a front end of the mounting portion is spaced apart from (i.e. separated from) the first protective base body, and at least a part of a rear end of the mounting portion is spaced apart from the second protective base body.

In one embodiment, an upper part of the front end of the mounting portion is spaced apart from the first protective base body, and an upper part of the rear end of the mounting portion is spaced apart from the second protective base body.

In one embodiment, the first protective base body is an annular structure surrounding the front end of the mounting hole.

In one embodiment, the second protective base body is an annular structure surrounding the rear end of the mounting hole.

In one embodiment, the mounting base body, the first protective base body and the second protective base body are integrally formed.

In one embodiment, the mounting base body further comprises a connecting portion, wherein the connecting portion is located below the mounting portion, the connecting portion is connected to the mounting portion, and the mounting portion and the connecting portion are both connected to the first protective base body and the second protective base body.

In one embodiment, the drop-resistant red dot scope base further comprises a connecting base, wherein the connecting base is located below the connecting portion and connected to the bottom of the connecting portion, wherein a bottom of the connecting base is provided with a connecting groove, wherein the connecting groove penetrates through the connecting base from front to back, and wherein the connecting groove is used for connecting with a gun barrel on a gun.

In one embodiment, the connecting portion is provided with a perforation, wherein the perforation vertically (i.e. up and down) penetrates through the connecting portion;

and the connecting base is provided with a screw hole, wherein the screw hole vertically (i.e. up and down) penetrates through the connecting base;

and the drop-resistant red dot scope base further comprises a fastening piece, wherein a head of the fastening piece abuts against the connecting portion, and a rod portion of the fastening piece sequentially passes through the perforation, the screw hole and is screwed to the screw hole.

In the second aspect, the embodiment of the present disclosure provides a red dot scope, comprising the aforesaid drop-resistant red dot scope base.

Advantages or beneficial effects in the above technical solutions include at least:

The red dot scope base of the present disclosure can protect a lens disposed in the mounting base body due to the provision of a first protective base body and a second protective base body at the front and rear ends of the mounting base body, respectively, wherein a projection in a forward and rearward direction of the first protective base body is provided protruding with respect to a projection in a forward and rearward direction of the mounting base body, and a projection in a forward and rearward direction of the second protective base body is provided protruding with respect to a projection in a forward and rearward direction of the mounting base body, so that the outer surface of the mounting portion is arranged to be retracted with respect to the outer surfaces of the both of the first protective base body and the second protective base body. Therefore, when the red dot scope base falls onto a hard ground due to an accident, the first protective base body and the second protective base body will touch the ground, thereby avoiding the mounting portion from touching the ground and preventing the lens mounted in the mounting portion from fracturing, and realizing all-round protection for the lens, with good drop-resistant performance and better durability, which can reduce the maintenance cost and help to promote the popularization and application.

The red dot scope of the present disclosure can also effectively prevent the lens from falling and cracking due to the aforementioned red dot scope base, and can realize all-round protection for the lens, with good drop-resistant performance and better durability, which can reduce the maintenance cost and help to promote the popularization and application.

The above summary is provided only for illustration, and is not intended to limit the present disclosure in any way. In addition to the illustrative aspects, embodiments and features described above, further aspects, embodiments and features of the present disclosure may be readily understood from the following detailed description with reference to the accompanying drawings.

BRIEF DESCRIPTION OF THE DRAWINGS

Unless otherwise specified, identical or similar parts or elements are denoted by identical reference signs throughout several figures of the accompanying drawings. The drawings are not necessarily drawn to scale. It should be understood that these drawings merely illustrate some embodiments of the present disclosure, and should not be construed as limiting the scope of the present disclosure.

Figure 1:
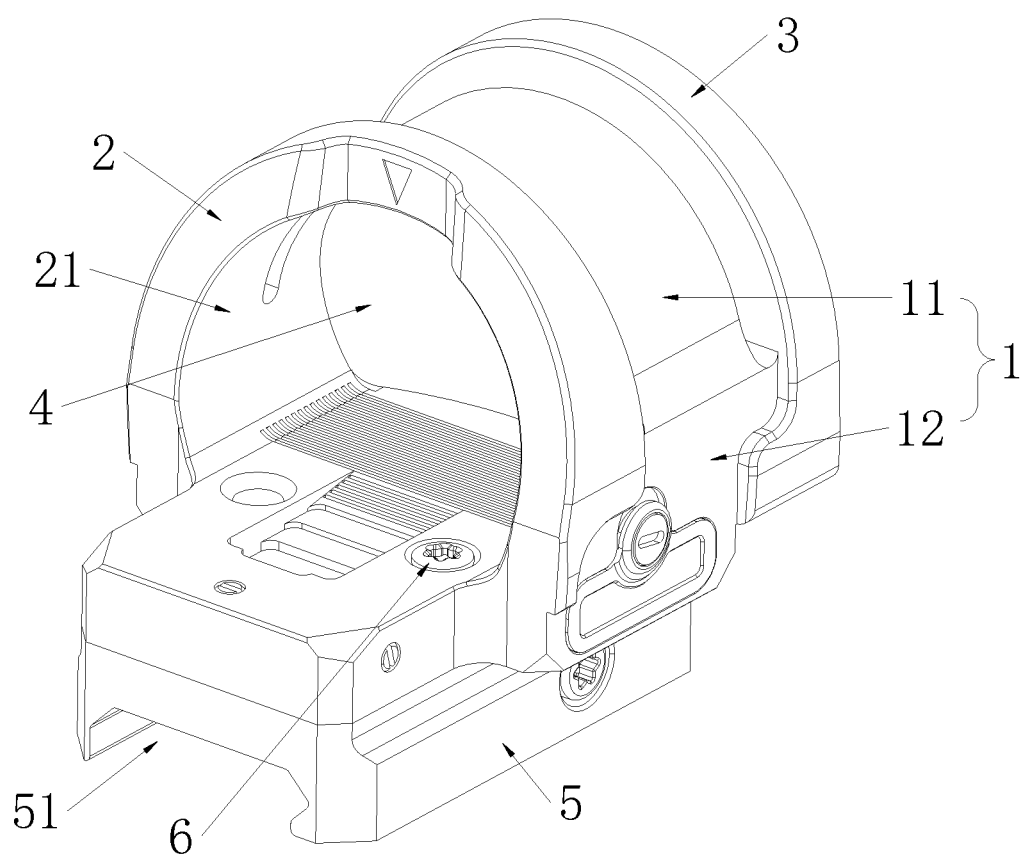
FIG. 1 is a schematic view of the three-dimensional structure of the red dot scope base of the present disclosure in a first view.

REFERENCE SIGNS IN THE DRAWINGS 1. mounting base body; 11. mounting portion; 111. mounting hole; 12. connecting portion; 121. perforation; 2. first protective base body; 21. first avoidance hole; 3. second protective base body; 31. second avoidance hole; 4. lens; 5. connecting base; 51. connecting groove; 52. screw hole; 6. fastening piece.

DETAILED DESCRIPTION OF THE PREFERRED EMBODIMENT

Hereinafter, only some exemplary embodiments are simply described. As can be recognized by a person skilled in the art, the described embodiments may be modified in various different ways without departing from the spirit or scope of the present disclosure. Accordingly, the drawings and the description should be considered as illustrative in nature instead of being restrictive.

Figure 2:
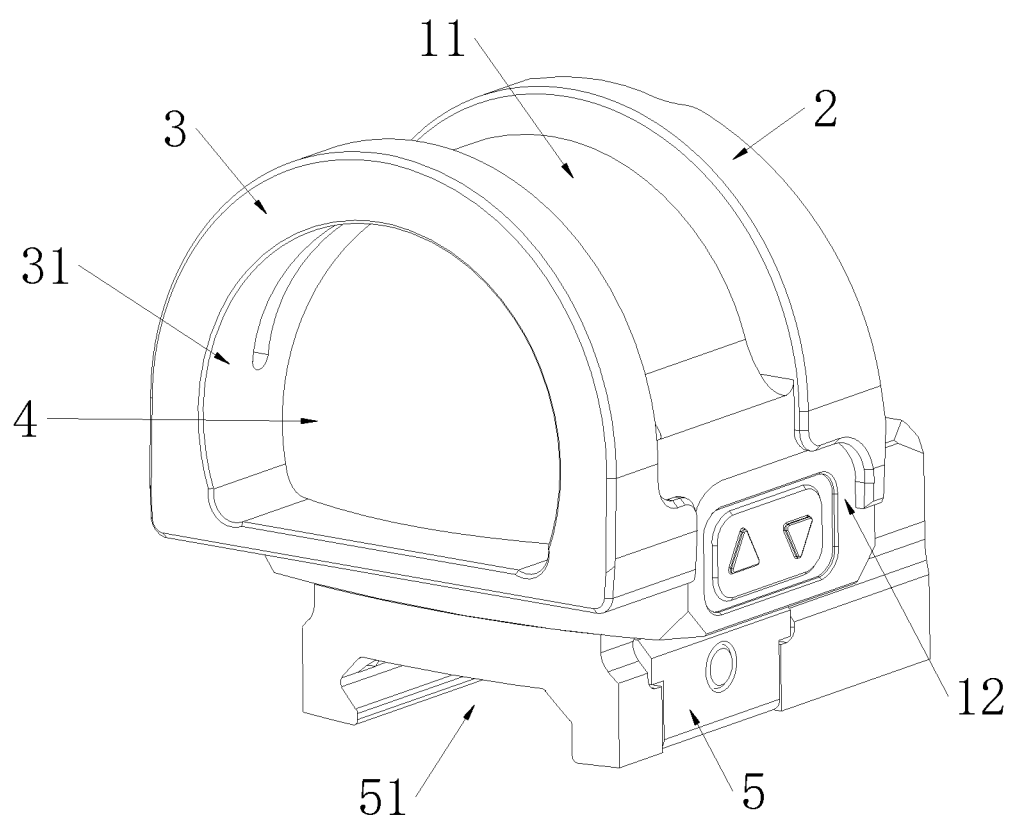
FIG. 2 is a schematic view of the three-dimensional structure of the red dot scope base of the present disclosure in a second view.
Figure 3:
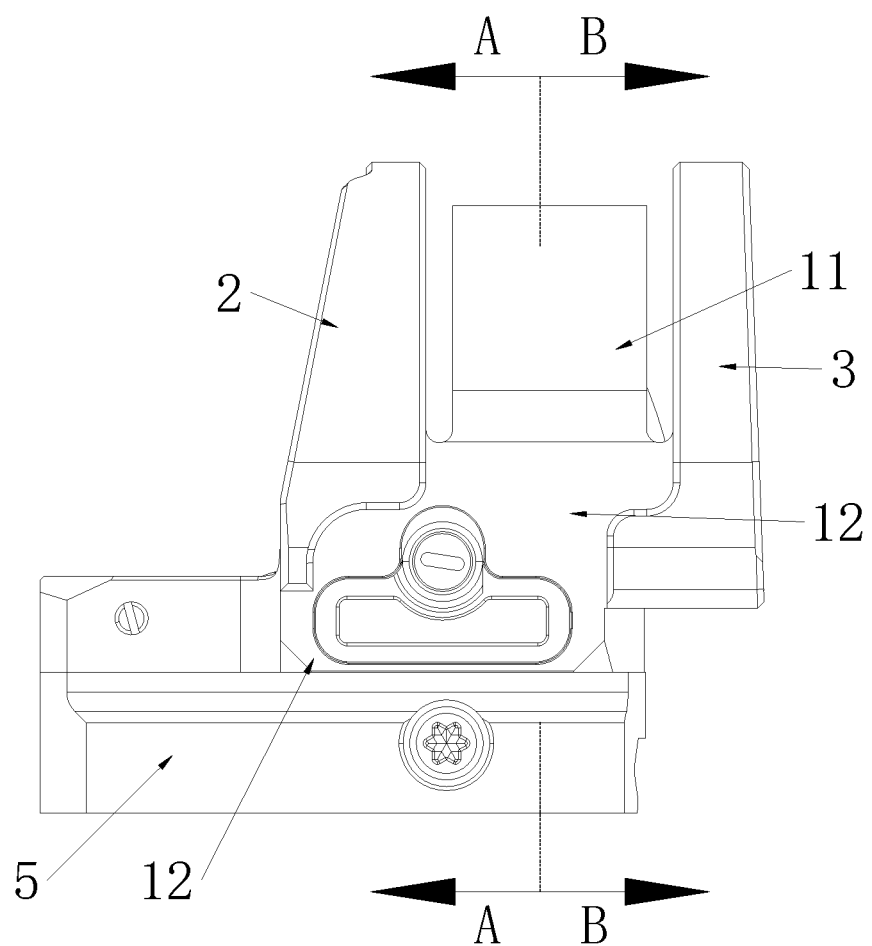
FIG. 3 is a schematic view of the three-dimensional structure of the red dot scope base of the present disclosure in a third view.

Referring to FIGS. 1-3, a drop-resistant red dot scope base of a preferred embodiment of the present disclosure is shown, comprising:

a mounting base body 1 having a mounting portion 11, wherein the mounting portion 11 is provided with a mounting hole 111, wherein the mounting hole 111 penetrates through mounting portion 11 from front to back and mounting hole 111 is used for accommodating a lens 4;

a first protective base body 2, wherein the first protective base body 2 is disposed on a front end of the mounting base body 1 and is connected to the mounting base body 1, wherein the first protective base body 2 is provided with a first avoidance hole 21, wherein the first avoidance hole 21 penetrates through the first protective base body 1 from front to back, wherein the first avoidance hole 21 is connected to the front end of the mounting hole 111 so as to expose the front end of the mounting hole 111 and to avoid obscuring the lens 4, and wherein a projection in a forward and rearward direction of the first protective base body 2 protrudes out of a projection in a forward and rearward direction of the mounting base body 1, i.e., the first protective base body 2 is provided protruding with respect to the mounting base body 1;

a second protective base body 3, wherein the second protective base body 3 is disposed on a rear end of the mounting base body 1 and is connected to the mounting base body 1, wherein the second protective base body 3 is provided with a second avoidance hole 31, wherein the second avoidance hole 31 penetrates through the second protective base body 3 from front to back, wherein the second avoidance hole 31 is connected to the rear end of the mounting hole 111 so as to expose the rear end of the mounting hole 111 and to avoid obscuring the lens 4, and wherein a projection in a forward and rearward direction of the second protective base body 3 protrudes out of a projection in a forward and rearward direction of the mounting base body 1, i.e., the second protective base body 3 is provided protruding with respect to the mounting base body 1.

The red dot scope base of the present disclosure can protect a lens 4 disposed in the mounting base body 1 due to the provision of a first protective base body 2 and a second protective base body 3 at the front and rear ends of the mounting base body 1, respectively, wherein a projection in a forward and rearward direction of the first protective base body 2 is provided protruding with respect to a projection in a forward and rearward direction of the mounting base body 1, and a projection in a forward and rearward direction of the second protective base body 3 is provided protruding with respect to a projection in a forward and rearward direction of the mounting base body 1, so that the outer surface of the mounting portion 111 is arranged to be retracted with respect to the outer surfaces of the both of the first protective base body 2 and the second protective base body 3. Therefore, when the red dot scope base falls onto a hard ground due to an accident, the first protective base body 2 and the second protective base body 3 will touch the ground, thereby avoiding the mounting portion 11 from touching the ground and preventing the lens 4 mounted in the mounting portion 11 from fracturing, and realizing all-round protection for the lens 4, with good drop-resistant performance and better durability, which can reduce the maintenance cost and help to promote the popularization and application.

Referring to FIG. 3, in one embodiment, at least part of the front end of the mounting portion 11 is spaced apart from the first protective base body 2, so as to achieve a better vibration isolation effect, when the red dot scope base falls onto a hard ground due to an accident, the vibration transmitted from the first protective base body 2 to the front end of the mounting portion 11 can be reduced, which in turn can enhance the protective effect of the lens 4 and make the lens 4 less likely to be cracked by the fall, and at the same time, the thickness of the front end of the mounting portion 11 is avoided to be too thick, so that the lens 4 is easier to be installed into the mounting portion 11, which can reduce the difficulty of the installation of the lens 4 and make the installation more efficient; and at least part of the rear end of the mounting portion 11 is spaced apart from the second protective base body 3, so as to achieve a better vibration isolation effect, when the red dot scope base falls onto a hard ground due to an accident, the vibration transmitted from the second protective base body 3 to the rear end of the mounting portion 11 can be reduced, which in turn can enhance the protective effect of the lens 4 and make the lens 4 less likely to be cracked by the fall, and at the same time, the thickness of the front end of the mounting portion 11 is avoided to be too thick, so that the lens 4 is easier to be installed into the mounting portion 11, which can reduce the difficulty of the installation of the lens 4 and make the installation more efficient.

Referring to FIG. 3, in one embodiment, an upper part of the front end of the mounting portion 11 is spaced apart from the first protective base body 2, and an upper part of the rear end of the mounting portion 11 is spaced apart from the second protective base body 3, so as to ensure a better vibration isolation effect, and at the same time, to enhance the connection strength between the first protective base body 2 and the mounting base body 1 as well as between the second protective base body 3 and the mounting base body 1, and thereby to make the red dot scope base difficult to cracking, and to ensure that it is able to provide an effective protection of the lens 4, and to provide a higher structural stability. In other embodiments, the front end of the mounting portion 11 may or may not include the rest portion of the upper portion and is spaced apart from the first protective base body 2, and the rear end of the mounting portion 11 may or may not include the rest portion of the upper portion and is spaced apart from the second protective base body 3. In other embodiments, the first protective base body 2 and the second protective base body 3 may be integrally formed, and the first protective base body 2 and the second protective base body 3 cover the mounting portion 11 to protect the mounting portion 11.

Figure 4:
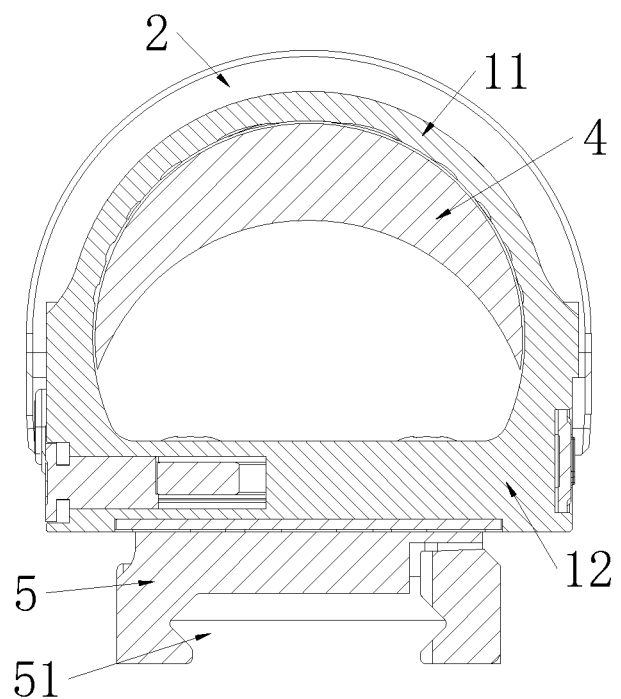
FIG. 4 is a cross-sectional view of the A-A direction in FIG. 3.

Referring to FIGS. 1 and 4, in one embodiment, the first protective base body 2 is an annular structure surrounding the front end of the mounting hole 111, which can realize all-round protection for the lens 4, avoid protection dead ends and provide higher structural reliability. The present disclosure does not limit the specific structure of the annular structure, and it can be configured according to actual needs, for example, the annular structure can be a circular ring structure, can be a square annular structure, and can also be an annular structure of another suitable shape.

Figure 5:
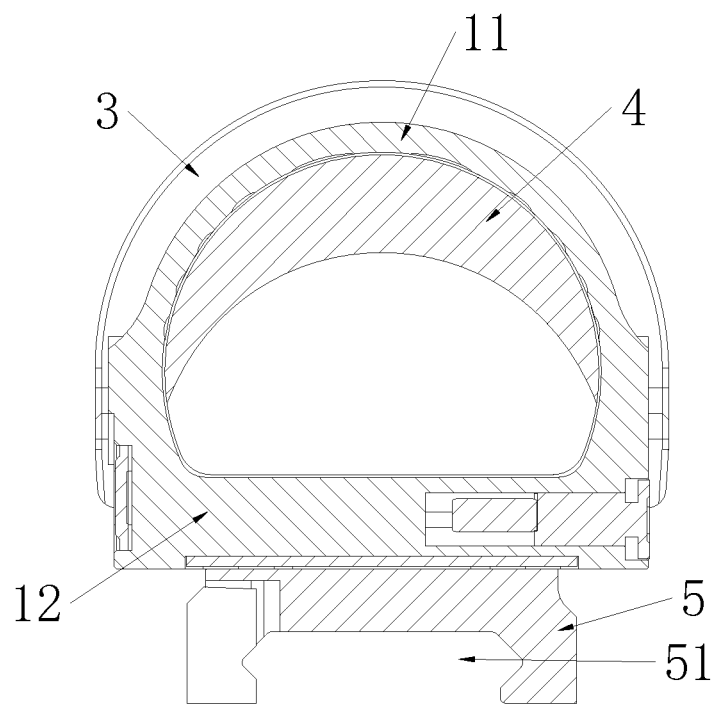
FIG. 5 is a cross-sectional view of the B-B direction in FIG. 3.

Referring to FIGS. 2 and 5, in one embodiment, the second protective base body 3 is an annular structure surrounding the front end of the mounting hole 111, which can realize all-round protection for the lens 4, avoid protection dead ends and provide higher structural reliability.

In one embodiment, the mounting base body 1, the first protective base body 2 and the second protective base body 3 are integrally formed, thereby improving the manufacturing efficiency, and at the same time, enhancing the connection strength between the first protective base body 2 and the mounting base body 1 as well as between the second protective base body 3 and the mounting base body 1, and thereby to make the red dot scope base difficult to cracking, and to ensure that it is able to provide an effective protection of the lens 4, and to provide a higher structural stability.

Certainly, in other embodiments, the mounting base body 1, the first protective base body 2 and the second protective base body 3 may be provided separately, i.e. all three are separate structures, connected together by a connecting structure.

In one embodiment, the mounting base body 1 further comprises a connecting portion 12, wherein the connecting portion 12 is located below the mounting portion 11, the connecting portion 12 is connected to the mounting portion 11, wherein the mounting portion 11 and the connecting portion 12 are connected to the first protective base body 2 and the second protective base body 3, which can further enhance the connection strength between the first protective base body 2 and the mounting base body 1 as well as between the second protective base body 3 and the mounting base body 1, and thereby to make the red dot scope base difficult to cracking, and to ensure that it is able to provide an effective protection of the lens 4, and to provide a higher structural stability. In other embodiments, the mounting portion 11 may not be connected to the first protective base body 2 and the second protective base body 3, and the mounting portion 11 is provided directly on the connecting portion 12. In other embodiments, the mounting base body 1 may not have a mounting portion 12, and the mounting portion 11, the first protective base body 2 and the second protective base body 3 are provided on the mounting base body 1.

In one embodiment, the drop-resistant red dot scope base further comprises a connecting base 5, wherein the connecting base 5 is located below the connecting portion 12 and connected to the bottom of the connecting portion 12, wherein the bottom of the connecting base 5 is provided with a connecting groove 51, wherein the connecting groove 51 penetrates through the connecting base 5 from front to back, and wherein the connecting groove 51 is used for connecting with the gun barrel on the gun to facilitate the connection of the drop-resistant red dot scope base and the gun and to improve the installation efficiency. In other embodiments, the drop-resistant red dot scope base may not have a connecting base 5, for example, the drop-resistant red dot scope base can be mounted to the side of the gun by means of a side mount.

Figure 6:
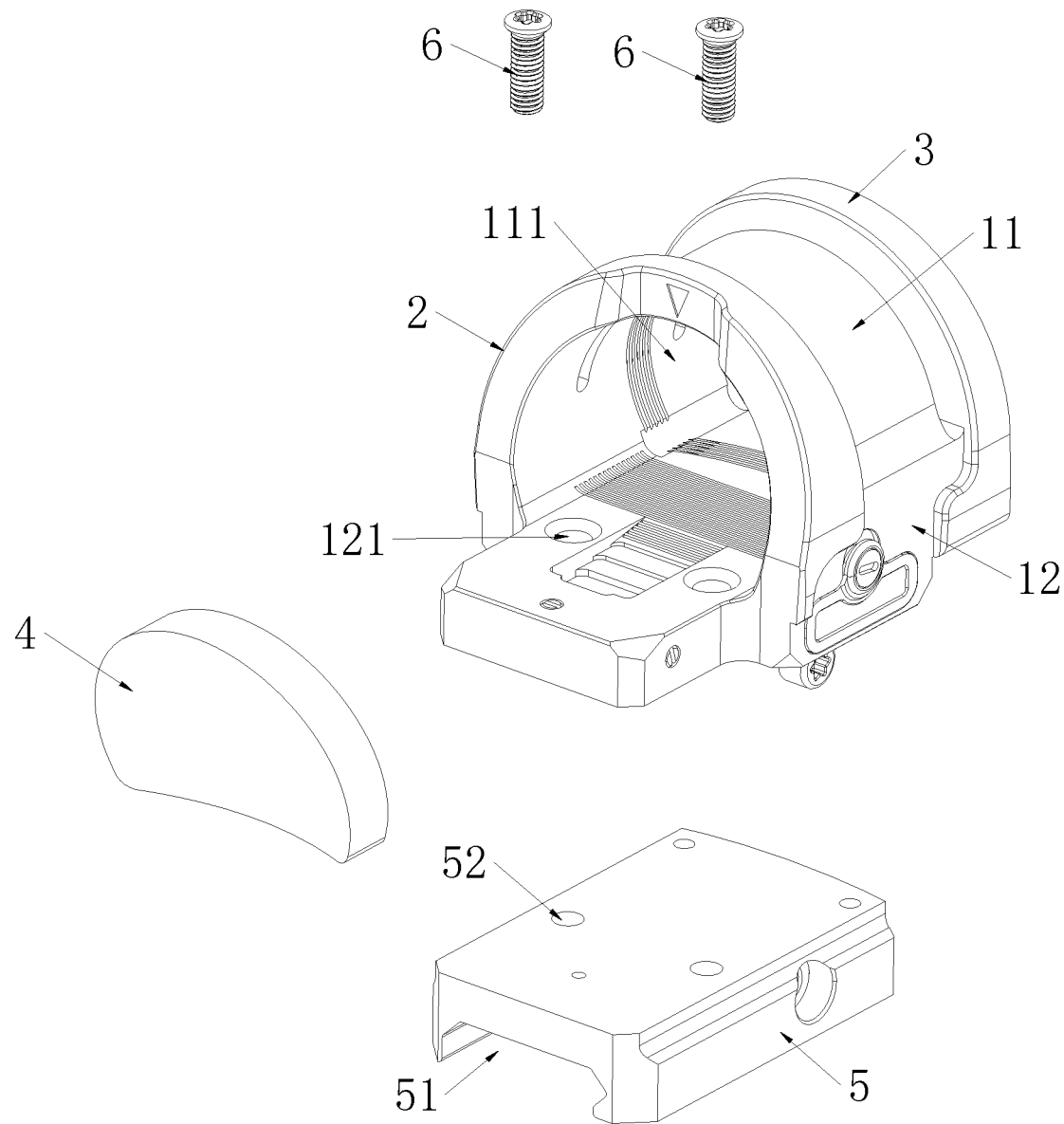
FIG. 6 is an exploded view of the red dot scope base of the present disclosure.

Referring to FIG. 6, in one embodiment, the connecting portion 12 is provided with a perforation 121, wherein perforation 121 vertically penetrates through the connecting portion 12; wherein the connecting base 5 is provided with a screw hole 52, wherein the screw hole 52 vertically penetrates through the connecting base 5; wherein the drop-resistant red dot scope base further comprises a fastening piece 6, a head of the fastening piece 6 abuts against connecting portion 12, and the rod portion of the fastening piece 6 sequentially passes through the perforation 121, the screw hole 52 and is screwed to the screw hole 52. That is to say, the mounting base body 1 and the connecting base 5 are provided separately to reduce the manufacturing difficulty and to improve the manufacturing efficiency. At the same time, the mounting base body 1 and the connecting base 5 are connected by fastening piece 6 to ensure a reliable connection between the two, which in turn enhances the structural strength of the drop-resistant red dot scope base and makes the structure more reliable. In addition, the connecting base 5 located underneath the connecting portion 12 can provide reinforced protection for the lens 4 located in the mounting portion 11, making the lens 4 less likely to fall and crack, and providing higher structural reliability. In other embodiments, other suitable structures may be used in place of the above structure and are not limited thereto.

In one embodiment, the aforesaid perforation 121 is a counter bore, and the head of the fastening piece 6 is accommodated in the perforation 121 to prevent the head of the fastening piece 6 from protruding relative to the connecting portion 12, thereby preventing interference with the line of sight and facilitating aiming.

A preferred embodiment of the present disclosure provides a red dot scope, comprising the aforesaid drop-resistant red dot scope base.

The red dot scope of the present disclosure can also effectively prevent the lens 4 from falling and cracking due to the aforementioned red dot scope base, and can realize all-round protection for the lens 4, with good drop-resistant performance and better durability, which can reduce the maintenance cost and help to promote the popularization and application.

In the depictions of the present description, reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Furthermore, the described specific features, structures, materials, or characteristics may be combined in any suitable manner in one or more embodiments or examples. In addition, in the case of no mutual contradiction, a person skilled in the art may incorporate or combine different embodiments or examples and features of different embodiments or examples described in the present description.

In addition, terms "first" and "second" are only used for illustration purpose and cannot be understood as indicating or implying relative importance or implicitly indicating the number of the meant technical features. Hence, a feature defined by "first" and "second" may explicitly or implicitly indicate that at least one the feature is included. In the depictions of said present disclosure, "a plurality of" means two or more, unless otherwise definitely and specifically defined.

The above description only relates to specific embodiments of the present disclosure, but the scope of protection of the present disclosure is not limited thereto, and any of a person skilled in the art can readily contemplate various changes or replacements within the technical scope of the present disclosure. All these changes or replacements should be covered by the scope of protection of the present disclosure. Therefore, the scope of protection of the present disclosure should be subject to the scope of protection of the appended claims.

The invention claimed is:

1. A drop-resistant red dot scope base, wherein it comprises:
a mounting base body having a mounting portion, wherein the mounting portion is provided with a mounting hole, the mounting hole penetrates through the mounting portion from front to back and the mounting hole is used for accommodating a lens;
a first protective base body, wherein the first protective base body is disposed on a front end of the mounting base body and is connected to the mounting base body, the first protective base body is provided with a first avoidance hole, the first avoidance hole penetrates through the first protective base body from front to back, wherein the first avoidance hole is connected to a front end of the mounting hole so as to expose the front end of the mounting hole, and a projection of the first protective base body in a forward and rearward direction protrudes out of a projection of the mounting base body in a forward and rearward direction;
a second protective base body, wherein the second protective base body is disposed on a rear end of the mounting base body and is connected to the mounting base body, the second protective base body is provided with a second avoidance hole, the second avoidance hole penetrates through the second protective base body from front to back, the second avoidance hole is connected to a rear end of the mounting hole so as to expose the rear end of the mounting hole, and a projection of the second protective base body in a forward and rearward direction protrudes out of a projection of the mounting base body in a forward and rearward direction.

2. The drop-resistant red dot scope base according to claim 1, wherein at least a part of a front end of the mounting portion is spaced apart from the first protective base body, and at least a part of a rear end of the mounting portion is spaced apart from the second protective base body.

3. The drop-resistant red dot scope base according to claim 2, wherein an upper part of the front end of the mounting portion is spaced apart from the first protective base body, and an upper part of the rear end of the mounting portion is spaced apart from the second protective base body.

4. The drop-resistant red dot scope base according to claim 1, wherein the first protective base body is an annular structure surrounding the front end of the mounting hole.

5. The drop-resistant red dot scope base according to claim 1, wherein the second protective base body is an annular structure surrounding the rear end of the mounting hole.

6. The drop-resistant red dot scope base according to claim 1, wherein the mounting base body, the first protective base body and the second protective base body are integrally formed.

7. The drop-resistant red dot scope base according to claim 1, wherein the mounting base body further comprises a connecting portion, the connecting portion is located below the mounting portion, the connecting portion is connected to the mounting portion, and the mounting portion and the connecting portion both are connected to the first protective base body and the second protective base body.

8. The drop-resistant red dot scope base according to claim 7, wherein the drop-resistant red dot scope base further comprises a connecting base, the connecting base is located below the connecting portion and connected to a bottom of the connecting portion, the bottom of the connecting base is provided with a connecting groove, the connecting groove penetrates through the connecting base from front to back, and the connecting groove is used for connecting with a gun barrel on a gun.

9. The drop-resistant red dot scope base according to claim 8, wherein the connecting portion is provided with a perforation, the perforation vertically penetrates through the connecting portion;
and the connecting base is provided with a screw hole, the screw hole vertically penetrates through the connecting base;
and the drop-resistant red dot scope base further comprises a fastening piece, a head of the fastening piece abuts against the connecting portion, and a rod portion of the fastening piece sequentially passes through the perforation, the screw hole and is screwed to the screw hole.

10. A red dot scope, wherein it comprises the drop-resistant red dot scope base according to claim 1.

* * * * *